(12) United States Patent
Knight et al.

(10) Patent No.: US 12,030,275 B2
(45) Date of Patent: Jul. 9, 2024

(54) MULTI-PROCESS ALLOY CLAD

(71) Applicants: Paul Knight, Spokane, WA (US); Eric Gamache, Spokane, WA (US)

(72) Inventors: Paul Knight, Spokane, WA (US); Eric Gamache, Spokane, WA (US)

(*) Notice: Subject to any disclaimer, the term of this patent is extended or adjusted under 35 U.S.C. 154(b) by 0 days.

(21) Appl. No.: 18/220,204

(22) Filed: Jul. 10, 2023

(65) Prior Publication Data

US 2023/0373190 A1 Nov. 23, 2023

Related U.S. Application Data

(63) Continuation of application No. 17/433,563, filed as application No. PCT/US2020/019947 on Feb. 26, 2020, now abandoned.

(60) Provisional application No. 62/811,512, filed on Feb. 27, 2019.

(51) Int. Cl.
| | |
|---|---|
| *B32B 15/01* | (2006.01) |
| *B23K 20/04* | (2006.01) |
| *B23K 20/24* | (2006.01) |
| *B23K 20/26* | (2006.01) |
| *B23K 35/00* | (2006.01) |
| *B23K 103/04* | (2006.01) |
| *B23K 103/10* | (2006.01) |
| *B23K 103/14* | (2006.01) |
| *B23K 103/20* | (2006.01) |

(52) U.S. Cl.
CPC ............ *B32B 15/012* (2013.01); *B23K 20/04* (2013.01); *B23K 20/24* (2013.01); *B23K 20/26* (2013.01); *B23K 35/002* (2013.01); *B23K 35/004* (2013.01); *B32B 15/013* (2013.01); *B23K 2103/04* (2018.08); *B23K 2103/10* (2018.08); *B23K 2103/14* (2018.08); *B23K 2103/20* (2018.08)

(58) Field of Classification Search
None
See application file for complete search history.

(56) References Cited

U.S. PATENT DOCUMENTS

| | | | | |
|---|---|---|---|---|
| 3,798,011 | A * | 3/1974 | Sharp, Jr. ............... | B23K 20/08 138/143 |
| 4,612,259 | A * | 9/1986 | Ueda ..................... | B32B 15/013 228/190 |
| 5,213,904 | A * | 5/1993 | Banker .................. | B32B 15/01 428/677 |
| 5,271,546 | A * | 12/1993 | Hardwick .............. | B23K 20/04 228/175 |

* cited by examiner

*Primary Examiner* — Daniel J. Schleis
(74) *Attorney, Agent, or Firm* — KNUBOX LLC

(57) ABSTRACT

A method of creating a clad metal part is provided. The method includes explosion bonding a plate comprised of a base layer and an interlayer. The explosion bonded plate is then cut into bars which are roll bonded with a clad layer. Ultimately a part is fabricated from the roll bonded bar. The solution enables parts to have material combinations and resulting physical properties more optimal for an application than a single bonding process.

2 Claims, 6 Drawing Sheets

MULTI-PROCESS ALLOY CLAD

CROSS REFERENCE TO RELATED APPLICATION

We hereby claim benefit under Title 35, United States Code, Section 120 of U.S. patent application Ser. No. 17/433,563 filed Aug. 24, 2021 entitled "MULTI-PROCESS ALLOY CLAD". This application is a continuation of the Ser. No. 17/433,563 application. The Ser. No. 17/433,563 application is currently pending. The Ser. No. 17/433,563 application is hereby incorporated by reference into this application.

STATEMENT REGARDING FEDERALLY SPONSORED R&D

Not related to this application.

TECHNICAL FIELD

This invention relates to a novel high temperature resistant and strong bi-metal electrical transition for use in the smelter industry, and the method of making it.

BACKGROUND OF THE INVENTION

Innovations in materials continues to enable engineered solutions to be lighter, stronger, less expensive, and more durable. Wherein a single material may be optimized to have some properties ideally suited for a given application, there is often a tradeoff between material properties. Rather than try to optimize a single material and live with the tradeoffs, metallurgical bonding of metals provides the advantage of creating a single material made from multiple metals and the combining of advantageous material properties.

A metallurgical bond is an atomic bond between two metals. The process for achieving the bond starts with surface preparation wherein the oxides on the metals are removed. The bond may then be created through heat, pressure and momentum. There are several methods of creating a metallurgical bond, each with its own strengths and weaknesses.

Explosion bonding may create a metallurgical bond through denotation of an explosive material on two or more separated cold metallic plates. The momentum, and resulting collision, of the plates is with sufficient energy to join the materials. Large quantities of materials may be quickly joined in a single detonation with the disadvantage of lack of precise control of the explosion process. The result is large amount of material may be joined inexpensively, but material combinations that require precision may not be possible. Explosion bonding works well with joining hard materials, such as steel to stainless steel, but can become difficult when joining alloy aluminums and thin or soft materials.

Diffusion bonding is the process of creating a metallurgical bond using just heat and pressure. Two or more metals have their oxides removed and are placed in contact within a vacuum enclosure to stop new oxides from forming. Heat and pressure slowly allow diffusion to occur resulting in a metallurgical bond. While diffusion bonding provides precise control over bonding variables and geometries, it is slow, expensive and has practical limitations in size.

Roll bonding is yet another method of creating a metallurgical bond. Two or more metals have their oxides mechanically removed and then they are reduced in thickness between two rollers. The reduction causes oxide layers to break, virgin materials to come in contact, and a metallurgical bond to form. Depending upon the materials and material combinations, each material may be rolled hot, warm or cold. Roll bonding provides a good balance between process control, process flexibility and cost.

The present invention is a bimetal clad transition and the methods for manufacturing it. The present invention utilizes the benefits of both roll and explosion bonding. In more detail and as an example application, the present invention may be optimally used to create high temperature resistant and strong clad weld transition for use in the aluminum smelter industry.

BRIEF DESCRIPTION OF THE DRAWINGS

Preferred embodiments of the invention are described below with the reference to the following accompanying drawings.

SUMMARY OF THE INVENTION

The present invention is a bimetal clad transition and the methods for manufacturing it. In more detail, the present invention is a high temperature resistant and strong clad weld transition for use in the aluminum smelter industry. The present invention utilizes the benefits of both roll and explosion bonding. These and other features, aspects, and advantages of the present invention will become better understood with regard to the following description and accompanying drawings.

DETAILED DESCRIPTION OF THE PREFERRED EMBODIMENTS

Many of the components and methods utilized in this invention are widely known and used in the field of the invention, and their exact nature or type is not necessary for a person of ordinary skill in the art or science to understand the invention; therefore, they will not be discussed in detail. For example, traditional welding is well known in the art of both metal fabrication and aluminum smelting and it does not need to be explained in detail for one to understand and practice the present invention without undue experimentation.

Aluminum production is a well-known and mature technology. Bauxite is mined from the earth and refined into aluminum oxide. Aluminum oxide is then turned into aluminum through the process of smelting. Oxygen is removed from the aluminum oxide to produce pure aluminum. The pure aluminum may or may not be mixed with other elements to create alloyed aluminum. Depending upon the final composition of the aluminum it is designated into an identifying series, such as 1100, 4032, 6061 or 7075. Each series has known physical, electrical and thermal properties and may be formed into desired shapes via rolling into plate or extruded. Some alloys are only available in extrusion and not plate.

The smelting process is predominantly done through a carbon bake process where carbon blocks are placed into baths of aluminum oxide to electrically cause the oxygen in the aluminum oxide to combine with the carbon of the carbon block to create carbon dioxide.

Figure 1:
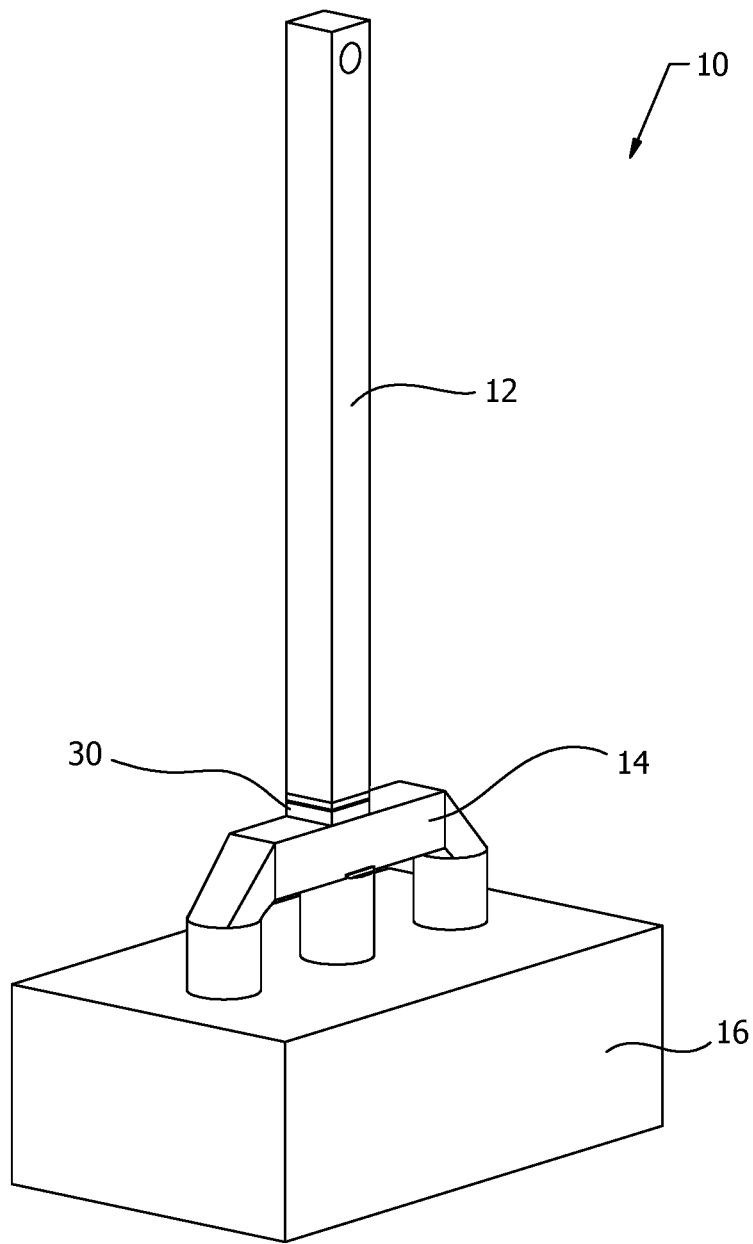
FIG. 1 is a front perspective view of a welded anode assembly according to the present invention.

A carbon anode assembly 10, according to present invention, is shown in FIG. 1. Anode assembly 10 is used to conduct the positive charge of the smelting process through the aluminum oxide and into the cathode bus (not shown). Anode assembly 10 is comprised of an anode bar 12 which is in electrical connection with a bus system (not shown). Typically, anode bar 12 is made from 4032 aluminum or an alloy of aluminum that provides optimal strength and electrical properties. Anode bar 12 must be able to support the weight of a carbon block 16 and resist reaction forces when moving anode assembly 10. The smelting process is performed at significant temperatures, great enough to weaken or melt anode bar 12. To withstand the heat, a yoke 14 is made from a temperature resistant material, such as steel or copper, and supports carbon block 16 in a region that the heat is unacceptable for anode bar 12. Because traditional welding between aluminum and steel is not possible, a weld transition is inserted and welded between yoke 14 and anode bar 12. Prior art weld transitions are metallurgically bonded dissimilar metals either formed by roll bonding or explosion bonding. The prior art weld transitions are made from low carbon steel and a high purity aluminum such as 1100 or 1050. High purity aluminum is very electrically conductive and readily bondable via both explosion and roll bonding. The aluminum side of a prior art weld transition is welded to anode bar 12 and the steel side of the prior art weld transition is welded to yoke 14, thus joining anode bar 12 to yoke 14.

Figure 2:
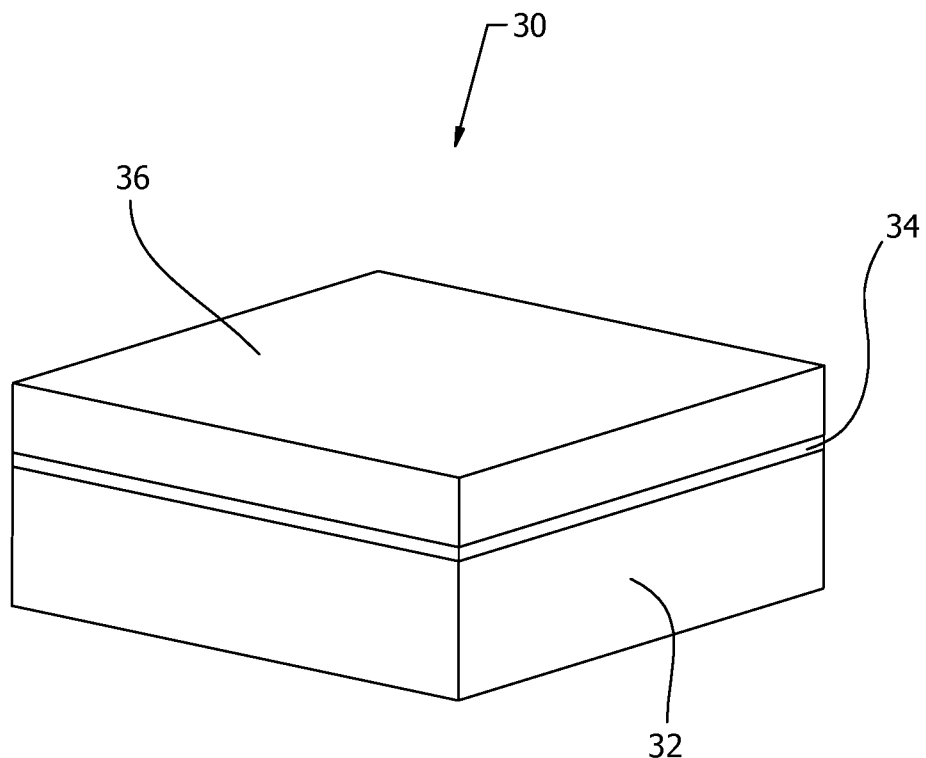
FIG. 2 is a front perspective view of a clad transition, according to the present invention, which is shown in use within the welded anode assembly of FIG. 1.

A novel clad transition 30 is shown welded to anode assembly 10 in FIG. 1 and is shown separately in FIG. 2. Clad transition 30 is comprised of a base layer 32, an interlayer 34 and a clad layer 36. Base layer 32 is preferably a steel, with a preferred alloy of 1008 or A36. Alternatively, base layer 32 may be made from copper. Preferably base layer 32 is 0.275 to 1.5 inches in height, but the present invention should not be construed to be limited to any particular thickness. Metallurgically bonded to base layer 32 is interlayer 34. Metallurgically bonded to interlayer 34 is clad layer 36 which is made from an alloy of aluminum and not a pure aluminum as used by the prior art. Interlayer 34 is used to resist diffusion of iron into the aluminum causing a breakdown of the metallurgical bond at high temperatures. The breakdown of the metallurgical bond is done through the Kirkendall effect which is well known in the art of metallurgically bonding dissimilar metals. According to the preferred embodiment of the present invention, interlayer 34 is titanium with a thickness of 1 mm, although other thickness can be used. In addition, instead of titanium, other materials may be used as interlayer 34 including but not limited to nickel and tantalum.

Prior art roll bonded weld transitions use chromium as an interlayer. Without the chromium interlayer, the Kirkendall effect may occur at a temperature less than 500 Celsius. Chromium stops the diffusion between dissimilar metals and allows prior art roll bonded weld transitions to hold up above 500 C. Modern day smelters may not create 400C temperatures at the point between anode bar 12 and yoke 14 during normal use, but the higher temperature resistance provides protection to anode assembly 10. Chromium is well suited for roll bonding prior art weld transitions as it can be electrodeposited onto steel prior to rolling the clad aluminum layer. The pure aluminum layer is roll bonded onto steel having the chromium. Due to the ability to roll bars, roll bonded aluminum may be produced from plate or extruded aluminum. Due to temperature limitations of aluminum, titanium is not viable as an interlayer with aluminum and steel when rolled together. Roll bonding steel to titanium is extremely challenging due to high temperatures required and the formation of oxides which hinder bonding. An advantage of roll bonding over explosion bonding is that alloy aluminums can readily be directly bonded to steel.

Alternatively, prior art explosion bonded weld transitions use titanium as an interlayer. Titanium provides temperature resistances greater than 550 C. Titanium and aluminum are explosion bonded to steel which is made possible at lower temperatures in comparison to roll bonding. Due to the size of the plates optimally suited for the economics of the explosion process, chromium is not well suited for explosion bonding due to the potential size requirement of chrome plating tanks. Also due to the size of explosion bonded plates, typically many feet wide by many feet long, explosion bonded aluminum must be available in plate and not extrusion. Furthermore, explosion bonding is not viable for bonding alloy aluminums directly to steel or titanium. Where alloy aluminums are bonded in explosion bonding process, a highly bondable low strength pure aluminum layer is bonded between the pure clad aluminum and the base metal. The strength of the resulting transition is only as strong as the pure aluminum layer which limits the overall strength of the clad assembly. The pure aluminum bond layer is the weakest link in an explosion bonded clad transition.

Novel clad transition 30 is produced from both roll bonding and explosion bonding. Explosion bonding is used to metallurgically bond base layer 32 to interlayer 34 in plate form. Clad layer 36 is then roll bonded to interlayer 34 to form clad transition 30. Clad transition 30 has the thermal "Kirkendall" resistance benefits of titanium and the strength benefits of a direct bond of an alloy aluminum for clad layer 36. According to the present invention, clad layer 36 is made from the highly electrically conductive alloy 6101, although other alloys may be used such as but not limited to 6063, 4032, 5083, 3003 and 6061. Alloy 6101 has electrical conductivity properties close to pure aluminum, it also provides increased strength over pure aluminum. Preferably clad layer 36 has alloying elements that include, but are not limited to one or more of magnesium, zinc, copper, manganese, iron, and silicon. According to the preferred embodiment of the present invention, clad layer 36 is comprised of aluminum having magnesium greater than two tenths of a percent by weight. According to the present invention, alloy clad layer 36 has a strength greater than 1000 series aluminum. Alloy clad layer 36 may have an ultimate tensile strength greater than 100 MPa. Furthermore, alloy clad layer 36 may increase in strength due to work hardening caused by roll bonding. Alloy clad layer 36 may also be heat treated after rolling. Alloy clad layer 36 may have a resulting strength greater than 200 MPa. Alloy clad layer 36 may have an aluminum purity less than 99%.

Figure 7:
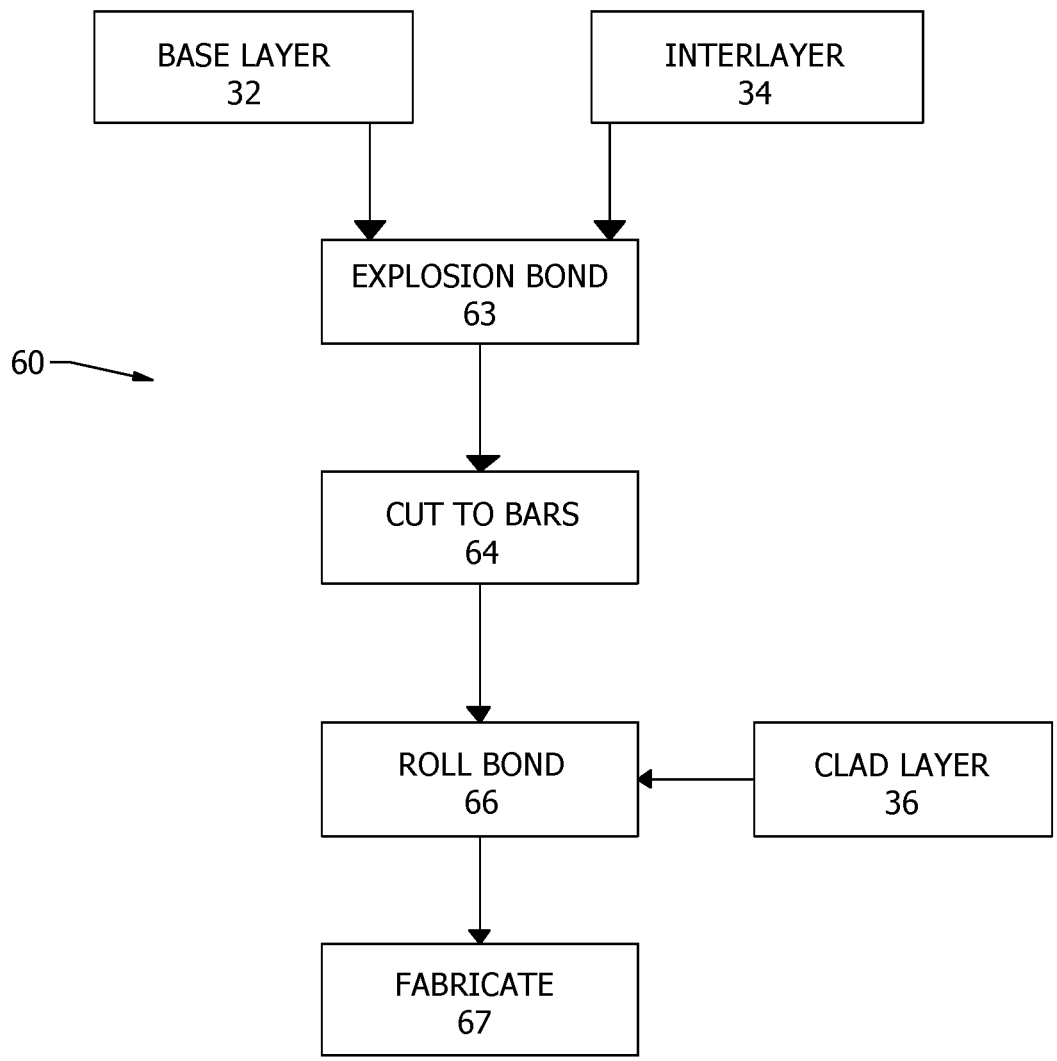
FIG. 7 is a flow diagram showing the process and methods for creating the clad transition of FIG. 2.

A manufacturing process 60 is used to create novel clad transition 30 and is shown by FIG. 7. Base layer 32 and interlayer 34 is prepared for a step of explosion bonding 63. Layers 32 and 34 are sanded or ground to remove oxide layers which facilitate explosion bonding. The step of explosion bonding 63 is well known in the art of metallurgically bonding and the exact steps are not needed for one in the art to understand and appreciate the present invention.

Figure 3:
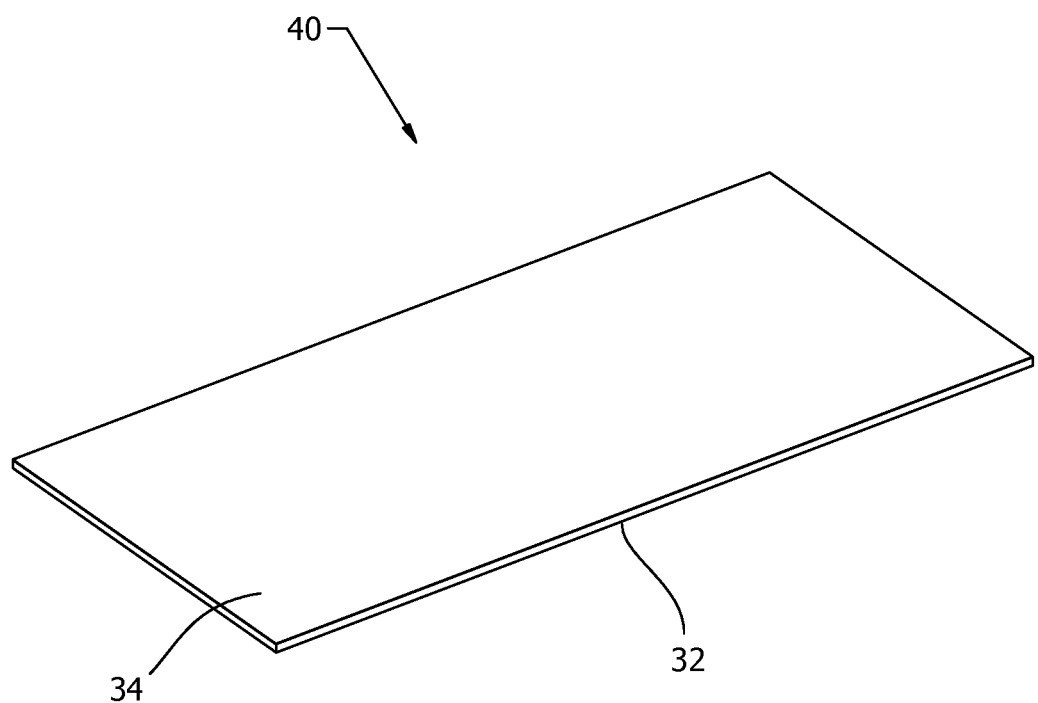
FIG. 3 is a front perspective view of an explosion bonded plate used to create the clad transition shown in FIG. 2.
Figure 4:
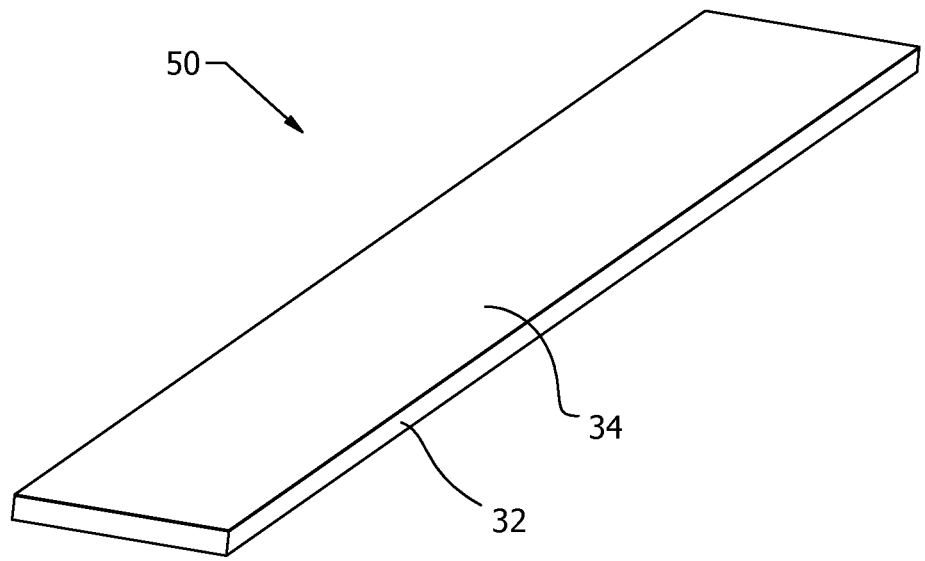
FIG. 4 is a front perspective view of an explosion bonded bar made from the plate of FIG. 3.
Figure 5:
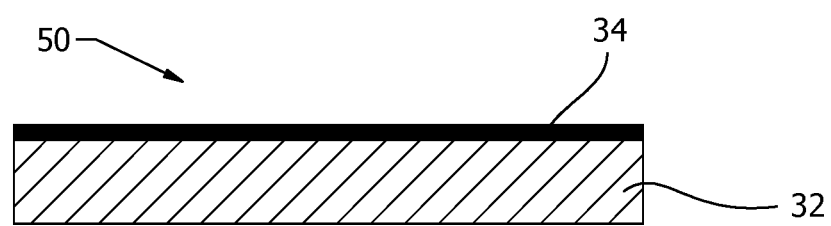
FIG. 5 is a cross section view of the explosion bonded bar of FIG. 4.

After the step of explosion bonding 63, an explosion plate 40 is created which is shown in FIG. 3. Base layer 32 is bonded to interlayer 34. Plate 40 is flattened and then cut to produce exploded bar 50. Bar 50 is comprised of base layer 32 and interlayer 34 and has a width and length optimized for roll bonding. The width of plate 40 is reduced by means of a cut to bars step 64. Preferably bar 50 has a width of less than 10 inches, but may be any width optimized for a particular rolling mill. A cross section of bar 50 is shown in FIG. 5.

Figure 6:
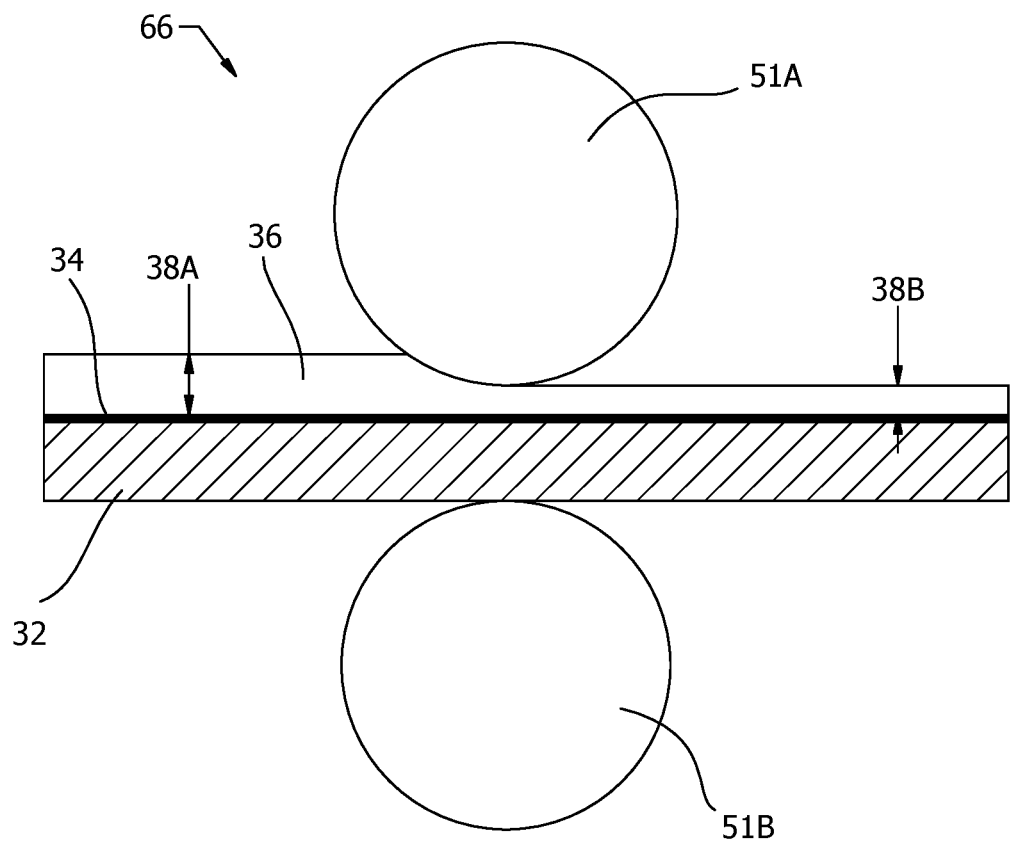
FIG. 6 is a side view of a roll bonding process adding a clad layer to the explosion bonded bar of FIG. 5.

Bar 50 is then roll bonded to clad layer 36 by means of a roll bond step 66. Roll bond step 66 is shown by FIG. 6. Interlayer 34 is already metallurgically bonded to base layer 32 though explosion bonding step 63. Clad layer 36 is placed on top of bar 50. Bar 50 and clad layer 36 are preferably heated to over 600 F and less than 700 F, although a hot clad layer 36 may also be rolled onto bar 50 that is room temperature, or hotter than 700 F. Two rollers, 51A and 51B reduce the thickness of clad layer 36 which causes a metallurgical bond between the alloy material of clad layer 36 and interlayer 34. An entry height 38A of clad layer 36 is typically twice the height of an exit height 38B. Preferably, exit height 38B is one half inch.

Finally, a fabrication step 67 creates the optimal dimensions of clad transition 30 for use within anode assembly 10. Fabrication step 67 may utilize saw cutting, machining, water jet cutting or any common method of cutting metals. The final size of clad 30 is optimized for welding to anode assembly 10 and typically ranges from one inch to less than ten inches in length and width.

The present invention of clad transition 30 is significantly stronger than prior art explosion bonded weld transitions that are limited to pure aluminum. The present invention is also not limited to the use of alloys that may only be available in plate or sheet form. The present invention also has a higher temperature resistance than can be created exclusively with a roll bonding process, which is accomplished by leveraging diffusion resistant interlayer materials that are most easily bonded through explosion bonding. The present invention may be optimally suited for a given smelting application by choosing an aluminum alloy for clad layer 36 which provides acceptable electrical resistance and strength, which may only be available in extrusion form and directly roll bonded.

Other embodiments are possible within the spirit and scope of the present invention. While three layers are shown, with each layer bonded to the interlayer with a different bonding process, it should be appreciated that any number of layers may be used. For instance, more than two layers may be bonded during the explosion process, by either exploding them with one shot or re-shooting a bonded plate with a new layer. Similarly, roll bonding may be accomplished with more than two layers of materials within one rolling process and multiple layers can be added sequentially with multiple rolling passes. Clad 30 may utilize both explosion and roll bonding to have more than three layers.

While the clad transition system herein described constitute preferred embodiments of the invention, it is to be understood that the invention is not limited to these precise form of assemblies, process and methods, and that changes may be made therein without departing from the scope and spirit of the invention.

We claim:

1. A method of creating a metal smelter transition part comprising:
    a first step of explosively forming a plate having a titanium interlayer with a thickness less than 2 mm metallurgically bonded to a base layer of carbon steel, said plate having a plate width greater than a part width of said part and a plate length greater than a part length of said part;
    cutting a bar from said plate, said bar having a bar width less than said plate width and a bar length greater than said part length;
    preheating a clad layer of aluminum having a tensile strength of at least 200 MPa to a temperature greater than 600 F and less than 800 F;
    rolling said clad layer onto said bar to create a metallurgical bond between said interlayer and said clad layer, wherein an entry height of said clad layer is at least twice an exit height of said clad layer;
    fabricating said part from said metallurgically bonded clad layer, said base layer and said interlayer;
    welding said clad layer to an anode bar; and,
    welding said carbon steel layer to a yoke.
2. The method of claim 1 further comprising heat treating said clad layer after said rolling to make said clad layer have a tensile strength greater than 200 MPa.

* * * * *